United States Patent
Sirhani et al.

(10) Patent No.: US 12,367,229 B2
(45) Date of Patent: Jul. 22, 2025

(54) SYSTEM AND METHOD FOR INTEGRATING MACHINE LEARNING IN DATA LEAKAGE DETECTION SOLUTION THROUGH KEYWORD POLICY PREDICTION

(71) Applicant: SAUDI ARABIAN OIL COMPANY, Dhahran (SA)

(72) Inventors: Ahmad F. Sirhani, Dammam (SA); Abdullah K. Madani, Dhahran (SA); Abdulrahman M. Alomar, Al Hasa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 359 days.

(21) Appl. No.: 17/804,055

(22) Filed: May 25, 2022

(65) Prior Publication Data
US 2023/0385407 A1    Nov. 30, 2023

(51) Int. Cl.
*G06F 16/35* (2025.01)
*G06F 16/93* (2019.01)
*G06F 21/55* (2013.01)

(52) U.S. Cl.
CPC .............. *G06F 16/35* (2019.01); *G06F 16/93* (2019.01); *G06F 21/554* (2013.01)

(58) Field of Classification Search
CPC ......... G06F 16/35; G06F 16/93; G06F 21/554
See application file for complete search history.

(56) References Cited

U.S. PATENT DOCUMENTS

| | | | |
|---|---|---|---|
| 8,423,483 B2 | 4/2013 | Sadeh-Koniecpol et al. | |
| 8,671,080 B1 | 3/2014 | Upadhyay et al. | |
| 8,862,522 B1 | 10/2014 | Jaiswal et al. | |
| 9,230,096 B2 | 1/2016 | Sarin et al. | |
| 9,342,697 B1* | 5/2016 | Ren | G06F 21/60 |
| 10,521,719 B1* | 12/2019 | Walters | G06F 16/335 |
| 10,979,458 B2 | 4/2021 | Narayanaswamy et al. | |
| 2009/0144255 A1* | 6/2009 | Chow | G06F 21/6218 |
| | | | 707/999.005 |
| 2014/0304197 A1* | 10/2014 | Jaiswal | G06F 21/6209 |
| | | | 706/12 |
| 2016/0203321 A1 | 7/2016 | Ayres et al. | |
| 2018/0336278 A1* | 11/2018 | Agarwal | G06F 16/35 |
| 2020/0226154 A1* | 7/2020 | Muffat | G06N 5/04 |
| 2022/0043850 A1* | 2/2022 | Mishra | G06F 16/35 |
| 2022/0337628 A1* | 10/2022 | Mudgil | H04L 63/1416 |

* cited by examiner

*Primary Examiner* — Hares Jami
(74) *Attorney, Agent, or Firm* — Osha Bergman Watanabe & Burton LLP

(57) ABSTRACT

A method which includes receiving a corpus of labelled documents according to a plurality of filters and parsing, by a computer processor, the corpus. The method further includes vectorizing, by the computer processor, the parsed corpus to obtain vectorized documents; and training, by the computer processor, a machine-learned model using, at least a portion, of the vectorized documents. The method further includes extracting word importances from the trained machine-learned model and retaining the words with associated importances that satisfy a criterion, wherein the retained words are suggested keywords. The method further includes incorporating the suggested keywords in a policy of a data leakage prevention system.

17 Claims, 7 Drawing Sheets

SYSTEM AND METHOD FOR INTEGRATING MACHINE LEARNING IN DATA LEAKAGE DETECTION SOLUTION THROUGH KEYWORD POLICY PREDICTION

BACKGROUND

Data leak prevention is an important task for large enterprises and businesses, wherein a large amount of data are transferred within and outside of the associated organizations and some of the data are considered confidential or otherwise sensitive. When a large amount of data are being exchanged, for example, in the form of thousands of emails per day, it is not amenable determine manually, by a subject matter expert, whether or not the data contains sensitive information and whether or not the data should be restricted and/or amended. Enterprises may rely on software tools to analyze and detect the presence of sensitive data within internal and external correspondences and other data transfer mechanisms. While these tools seek to automate the process of determining the presence of sensitive data and holding or quarantining an offending data item, these tools require constant maintenance and tailoring to remain effective with ever-changing demands and definitions of data sensitivity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

One or more embodiments disclosed herein generally relate to a method which includes receiving a corpus of labelled documents according to a plurality of filters and parsing, by a computer processor, the corpus. The method further includes vectorizing, by the computer processor, the parsed corpus to obtain vectorized documents; and training, by the computer processor, a machine-learned model using, at least a portion, of the vectorized documents. The method further includes extracting word importances from the trained machine-learned model and retaining the words with associated importances that satisfy a criterion, wherein the retained words are suggested keywords. The method further includes incorporating the suggested keywords in a policy of a data leakage prevention system.

One or more embodiments disclosed herein generally relate to a non-transitory computer readable medium storing instructions executable by a computer processor, the instructions including functionality for receiving a corpus of labelled documents according to a plurality of filters. The instructions further include functionality for parsing the corpus and vectorizing the parsed corpus to obtain vectorized documents. The instructions further include functionality for training a machine-learned model using, at least a portion, of the vectorized documents and extracting word importances from the trained machine-learned model. The instructions further include functionality for retaining the words with associated importances that satisfy a criterion, wherein the retained words are suggested keywords and incorporating the suggested keywords in a policy of a data leakage prevention system.

One or more embodiments disclosed herein generally relate to a system which includes a data leak prevention system configured by a policy, wherein the policy consists of a plurality of keywords and a plurality of Boolean logic operators, a repository containing a plurality of labelled documents a machine-learned model, wherein the machine-learned model processes a vectorized representation of a document and returns a classification, a data fetcher, wherein the data fetcher selects a corpus of labelled documents from the repository according to a plurality of filters, and a computer. The computer includes one or more computer processors and a non-transitory computer readable medium storing instructions executable by a computer processor. The instructions include functionality for receiving the corpus, parsing the corpus, vectorizing the corpus to obtain vectorized documents, training the machine-learned model using, at least a portion, of the vectorized documents, extracting word importances from the trained machine-learned model, retaining the words with associated importances that satisfy a criterion, wherein the retained words are suggested keywords, and incorporating the suggested keywords into the policy of the data leakage prevention system.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1A:
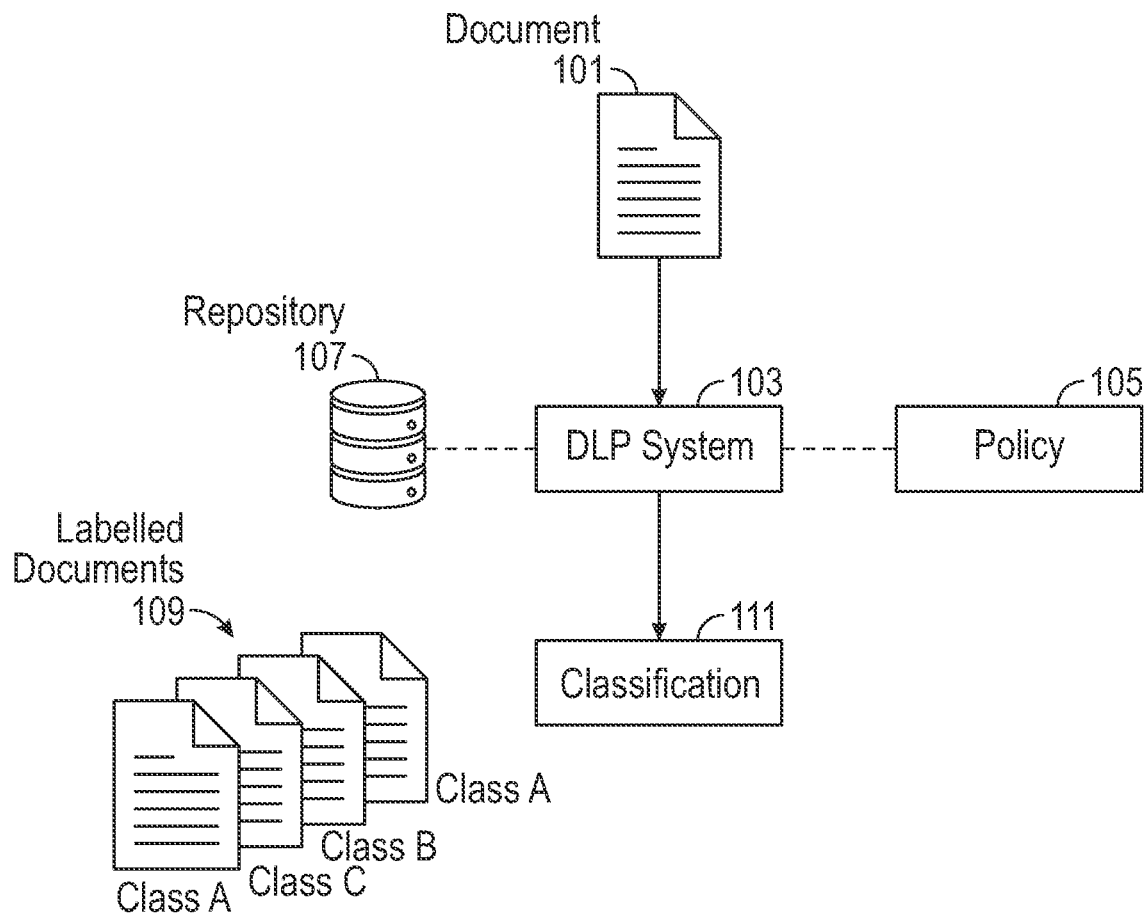
FIG. 1A depicts a data leak prevention system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Data leak prevention is an important task for large enterprises and businesses, wherein a large amount of data is transferred within and outside of the associated organizations and some of the data are considered sensitive. Herein, an item of transferred data is said to be a "document". Examples of a document may include, but are not limited to: an email; a spreadsheet; a text file; or a binary file. Additionally, a document may contain meta data describing the document itself; such as the origin of the document, the length of the document, etc.

The "sensitivity" of a document indicates the degree of protection associated with the data within the document. A document may be assigned a "sensitivity" according to various classes. For example, for the case of binary classification, documents may be classified into one of two classes such as "sensitive" and "not-sensitive", or "confidential" and "non-confidential". Multi-class classification may also be considered where, for example, documents may be designated according to the classes "public", "general use", "confidential", and "secret". The number of classes, their naming convention, and the degree of protection each class should be afforded may be selected with respect to the needs of an organization. That is, one with ordinary skill in the art will appreciate that the aforementioned example sensitivity classifications are non-limiting.

When a large amount of data are being exchanged, for example, in the form of thousands of documents per day, it is not amenable to determine manually, by a subject matter expert, the sensitivity of each document and to decide whether or not the document should be restricted, amended, and/or quarantined. Enterprises may rely on software tools to analyze and detect the presence of sensitive data within documents that are exchanged, or to be exchanged, internally or externally to the enterprise. These software tools will hereafter be referred to as a data leak prevention (DLP) system. While these tools seek to automate the process of identifying and classifying documents according to the sensitivity of their content, these tools require constant maintenance and tailoring to remain effective with ever-changing demands and definitions of data sensitivity. For example, large enterprises may be comprised of various organizations or departments, such as a finance department and a human resources department. Each of these organizations within an enterprise may have distinct needs with respect to the task of data leak prevention. This is because, intuitively, the language concerning confidential matters is unique to an organization. Additionally, DLP systems must be frequently updated as the sensitivity of data may change with time. In other words, data or subject matter once considered sensitive may no longer be considered sensitive or vice versa.

FIG. 1A depicts an example DLP system (103) in accordance with one or more embodiments. The DLP system (103) may receive a document (101) (e.g. an email) and outputs a classification (111). As previously stated, the classification may be binary or multiclass and the exact nomenclature of the classes may be decided upon by the enterprise. In the embodiment of FIG. 1A, the DLP system (103) is configured by a policy (105). A policy (105) may be considered a set of rules or parameters which govern the behavior of the DLP system (103). Different organizations within an enterprise, for example a human resources department and a finance department, may use different policies (105) when using the DLP system (103). In this way, the DLP system (103) may be tailored for various use cases according to a policy (105).

In some embodiments, the DLP system (103) may also include, or otherwise be linked to, a repository (107). The repository (107) contains all documents (101) of the enterprise. In accordance with one or more embodiments, the documents (101) of the repository (107) may be labelled documents (109). Herein, the label of the documents refers to the classification (111) of the document (101). Without loss of generality, FIG. 1A depicts the labelled documents (109) pertaining to one of multiple classes; namely, class A, class B, or class C. The names of the classes, A, B, C, are intended as placeholders and may be exchanged for any level of sensitivity as determined by an enterprise. Additionally, the number of classes need not be restricted to three classes. In one or more embodiments, the classification of a labelled document (109) may come from an end-user or the author of the document (101). In this case, the classification of the labelled document (109) corresponds to the sensitivity of the document (101) according to the end-user or author and may not correspond to the same class designation as would be applied by a subject matter expert or by the enterprise as a whole. In one or more alternate embodiments, the classification of the labelled documents (109) is the result of one or more previous applications of the DLP system (103), where the policy (105) of the DLP system (103) was selected by a subject matter expert. In some embodiments, the document (109) labels may be supplied or altered, manually, by a subject matter expert.

In accordance with one or more embodiments, the policy (105) of the DLP system (103) is based on one or more sets of keywords (113) combined with rules of Boolean logic (115). Boolean logic (115) comprises the common logical operators of "AND" and "OR". More complicated operators such as "XOR" may also be used in a policy (105). One with ordinary skill in the art will appreciate that any Boolean logic (115) may be applied without exceeding the scope of the present disclosure.

Figure 1B:
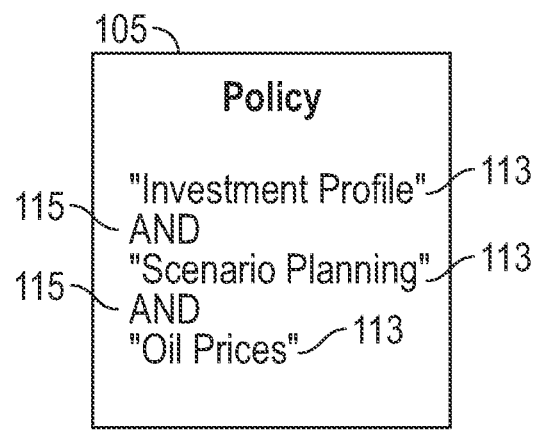
FIG. 1B depicts a data leak prevention system policy in accordance with one or more embodiments.

An example of a set of keywords (113) and associated Boolean logic (115) operators used to construct a simple policy (105) is shown in FIG. 1B. It is noted that a keyword (113) may be constructed of one or more words and may be a phrase. In other words, a keyword (113) is not restricted to a single word. As shown in the simplified policy (105) of FIG. 1B, the set of keywords (113) and associated Boolean logic (115) operators (in FIG. 1B, the operators are "AND") define a condition. The DLP system (103) provides a classification based on whether or not the condition is met. More complicated policies (105) may be constructed using additional keywords (113) and Boolean logic (115) operators, and by using one or more sets of keywords (113) and Boolean logic (115) operators to define one or more conditions.

In one aspect, embodiments disclosed herein relate to identifying keywords (113) to use in a DLP system (103) configured with a keyword-based policy (105) using a machine learning (ML) system and data fetching interface directly integrated with the DLP system (103). The identified keywords (113) are both up-to-date with the ever-changing data sensitivity needs of an enterprise and are tailored to an organization within the enterprise. By using ML to identify the keywords (113), a policy (105) may be developed without a subject matter expert, or the identified keywords (113) may be used to inform a subject matter expert to enhance and accelerate the construction of a policy (105).

Machine learning (ML), broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning (ML), or machine-learned, will be adopted herein, however, one skilled in the art will recognize that the concepts and methods detailed hereafter are not limited by this choice of nomenclature.

Machine-learned model types may include, but are not limited to, k-means, k-nearest neighbors, neural networks, logistic regression, random forests, generalized linear models, and Bayesian regression. Machine-learned model types are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. Commonly, in the literature, the selection of hyperparameters surrounding a model is referred to as selecting the model "architecture". Greater detail regarding the machine-learned model type, in accordance with one or more embodiments, will be provided below in the present disclosure.

Figure 2:
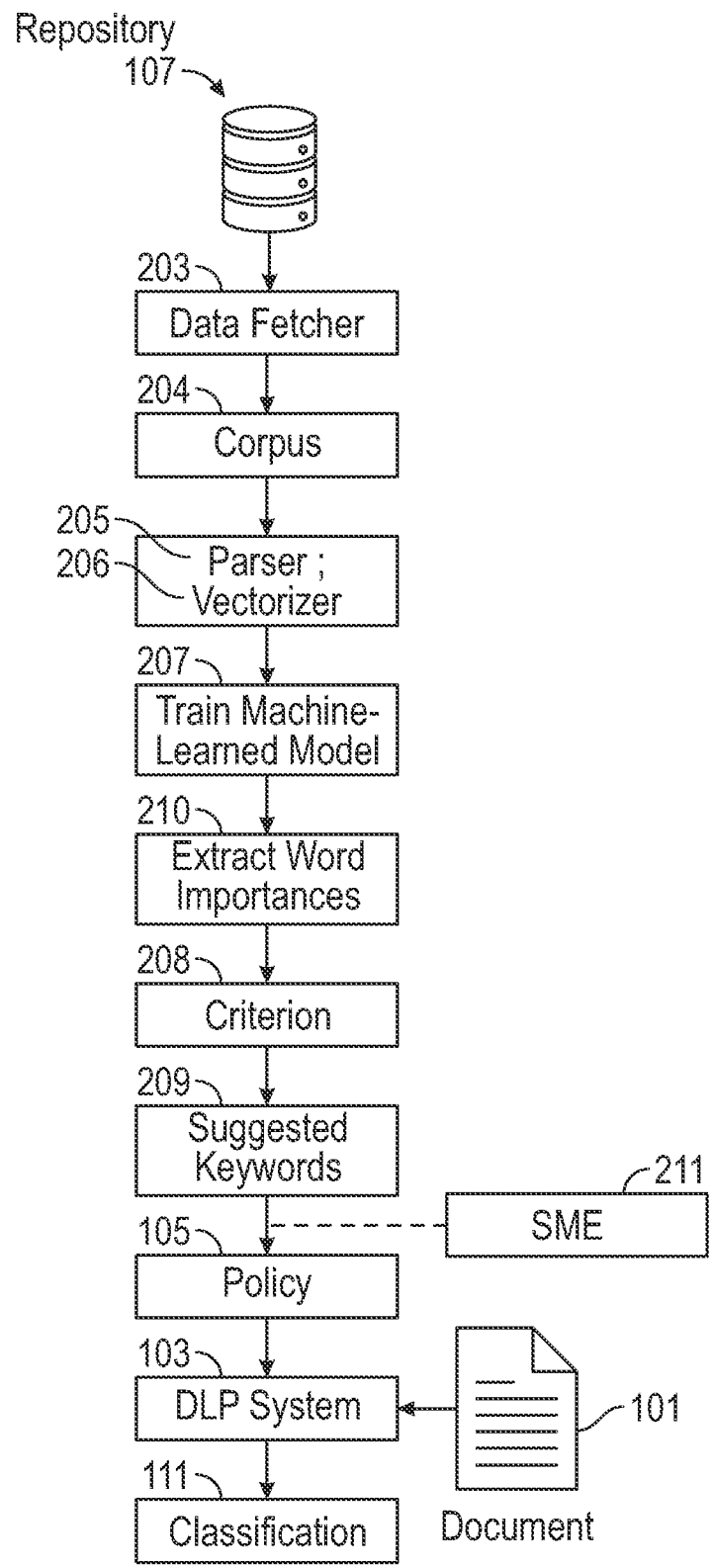
FIG. 2 depicts a method in accordance with one or more embodiments.

FIG. 2 depicts an overview of generating and using a keyword-based policy (105) in a DLP system (103), wherein the keywords (113) are suggested by a machine-learned model, in accordance with one or more embodiments. In accordance with one or more embodiments, a repository (107), which contains all the labelled documents (109) of an enterprise, is accessed using a data fetcher (203). The data fetcher (203) is an interface which allows the retrieval of documents according to a query. A query may be considered a plurality of filters. The data fetcher (203) may be composed of any number of computational methods and application programmer interfaces (APIs) needed, or known in the art, to access the repository (107). For example, the repository (107) may be a SQL-based repository (107). In this case, the data fetcher (203) may be a graphical user interface (GUI) used to filter and select documents (107) from the repository (107), where interaction with the GUI issues SQL commands to the repository (107). In accordance with one or more embodiments, the query includes an organization filter and a date range filter. In this case, with these filters, only the labelled documents (109) from the repository (107) which correspond to the requested organization, and which have dates within the date range, are returned by the data fetcher (203). Using the data fetcher (203), a user may temporarily and securely retrieve a subset of labelled documents (109) from the repository (203), according to a query defined by the user, for use with the ML system. The subset of labelled documents (109) which meet the conditions of a query and are temporarily and securely returned by the data fetcher (203) are herein referred to as a corpus (204). It is stated that the corpus is "temporarily and securely" maintained because only an ML system consisting of a parser, a vectorizer, and a machine-learned model, as is described in greater detail below, has access to the corpus (204). Further, once the ML system has finished processing the corpus, the corpus (204) is deleted. In accordance with one or more embodiments, the data fetcher (203) and ML system may be directly integrated with a DLP system (103). In this way, documents (101) maintained in the repository (107) are secure and cannot be accessed by an adversary, or otherwise compromised, through the data fetcher (203) or any part of the ML system.

Continuing with FIG. 2, the corpus (204) is passed to a parser (205). The parser (205) identifies words in the corpus. Here, like the keywords, the words are not restricted to a single word but may be composed of multiple words. That is, parsed words may be a phrase. The identified words may further be parsed by the parser (205) such that not all identified words are retained. For example, the parser (205) may remove, or ignore, common words such as "the", "and", "that", and "it" and the parser (205) may remove punctuation. While these examples are given in the English language, the parser (205) may be configured to interact according to the nuances of any written language. In some contexts, the parser (205) may be referred to as a tokenizer. The parser (205) may use any technique known in the art, such as white space tokenization, or the parser may make use of opens-source libraries such as spaCy, Gensim, NLTK, and TextBlob.

The labelled documents (109) of the corpus (204), with parsed words, are processed with a vectorizer (206). The vectorizer (206) transforms each labelled document (109) into a numerical representation suitable for processing by a machine-learned model (207). Generally, the numerical representation of each labelled document (109) in the corpus (204) is a vector. One with ordinary skill in the art will appreciate that in many circumstances the functionality of the parser (205) and vectorizer (206) may be combined. Further, the identification of words, parsing, and vectorization may be performed by any technique known in the art without exceeding the scope of this disclosure. Techniques for parsing and vectorization of words and documents are often discussed and found in the art of Natural Language Processing (NLP). These techniques may include, but are not limited to: bag-of-words, n-grams, true frequency-inverse document frequency (TF-IDF), and embeddings. In accordance with one or more embodiments, these techniques may be combined. For example, the words may be extracted and parsed according to a white space tokenizer, and then adjacent pairs of words may be combined to form 2-grams. The 2-grams may be processed with an open-source word embedder, such as Word2Vec or FastText, to form a numerical value for each word, and the words in a document may be compiled in a vector to represent the document. These techniques may also include functionality to account for spelling errors, synonyms, capitalization, and language specific nuances such as contractions and punctuation. The vector representation of documents may be further pre-processed, for example, through normalization.

The vector representations of the labelled documents (109) of the corpus (204) are used to train a machine-learned model (207). The process of training a machine-learned model (207) will be described in greater detail below. Once trained, word importances (210) are extracted from the machine-learned model. A "word importance" is a numerical value, associated with a word identified in the corpus (204), which indicates how likely it is that the associated word should be included in the policy (105) of the DLP system (103). The extracted word importances (210) are evaluated with a criterion (208). The criterion (208) is a condition. If the importance of a word satisfies the criterion, said word is promoted as a suggested keyword (209). For example, in one embodiment, only the words which have an absolute importance that exceeds a value X (i.e. |importance|>X), where X is a real-valued number, are promoted as suggested keywords (209). That is, in the above example, the criterion is a simple threshold condition. The value X is selected by a user. In another embodiment, the criterion (208) is a number of words to be promoted to suggested keywords (209). In this case, the condition (208) may dictate that only Y number of words with the highest importances become suggested keywords (209), wherein Y may be any integer greater than 0 and less than or equal to the total number of parsed words from the corpus (204). In accordance with other embodiments, the criterion (208) is constructed to promote the processed words with the lowest weight values to suggested keywords (209).

The suggested keywords (209) are the words from the corpus (204) which, according to the machine-learned model (207) and criterion (208), should be considered for use in a keyword-based policy (105) of a DLP system (103). It is emphasized that once suggested keywords (209) are formed, the corpus is deleted to promote data security and prevent unwanted access to the repository (107). Again, it is stated that, the words may be phrases such that the suggested keywords (209) may mimic the example keywords (113) of FIG. 1B. As shown in FIG. 2, the suggested keywords (209) are used to construct a policy (105). The suggested keywords (209) may be automatically adopted into the policy (105) or may be reviewed by a subject matter expert (SME) (211) before adoption into the policy (105). FIG. 2 re-iterates that once a policy (105) has been defined, it may be used to configure a DLP system (103). The DLP system (103) may accept a document (101), which may be a new document (101) not originating from the repository (107), and assign the document (101) a classification (111). The new document (101) and associated classification (111) may be added to the repository (107) and/or be reviewed by a subject matter expert.

Figure 3A:
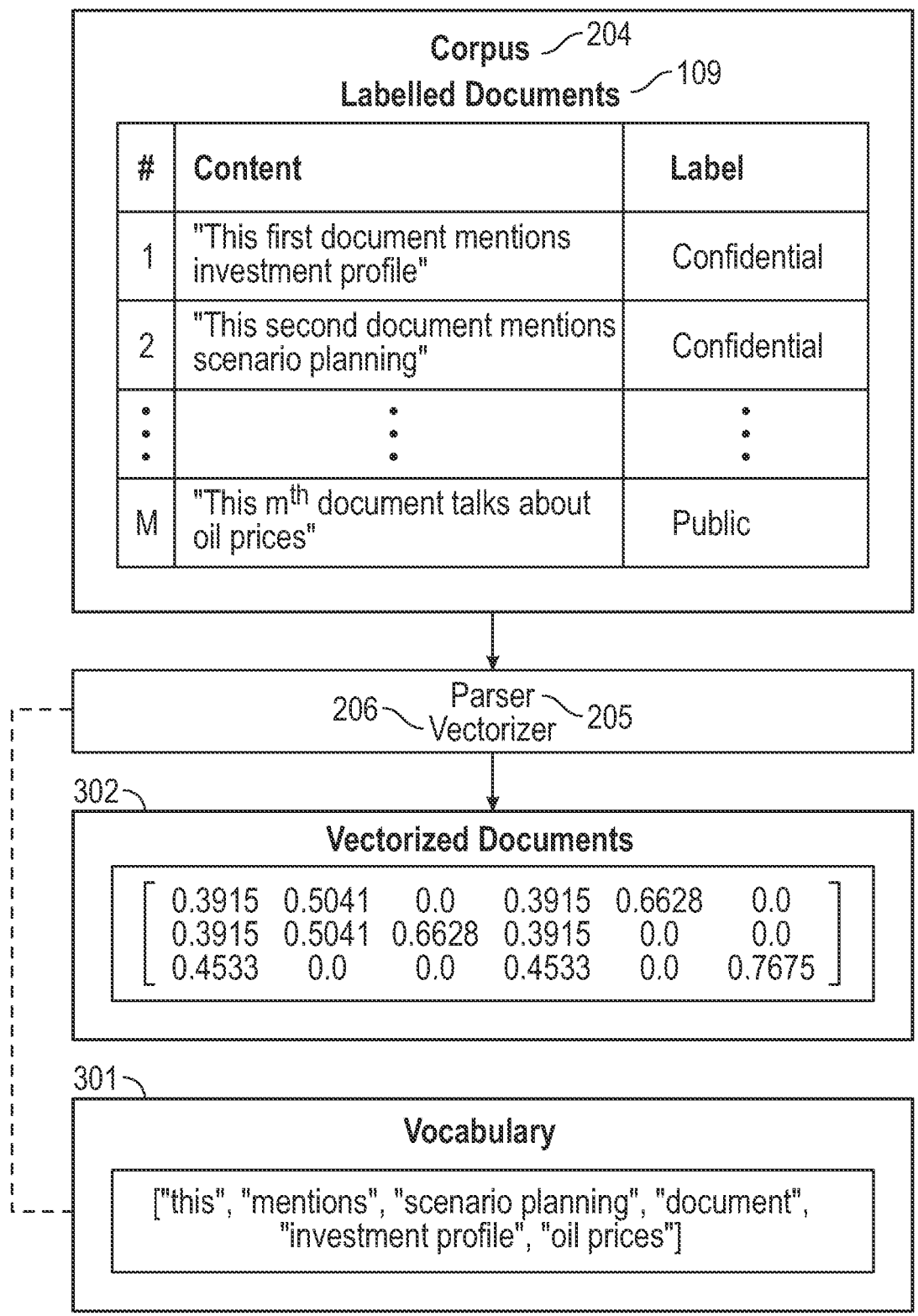
FIG. 3A depicts a parser and vectorizer in accordance with one or more embodiments.

In accordance with one or more embodiments, FIG. 3A provides an example of a parser (205) and a vectorizer (206). As seen in the example of FIG. 3A, a corpus (204) composed of labelled documents (109) has been retrieved from a repository (107) by the data fetcher (203) according to a query. The corpus (204) consists of m labelled documents (109). In this example, each document has a binary label; namely, "confidential" or "public". Additionally, in FIG. 3A, the content of each labelled document (109) is shown. The displayed content is for example purposes only. One with ordinary skill in the art will appreciate that the representative content of documents may vary greatly from that shown in FIG. 3A, such that the example of FIG. 3A does not impose a limitation on the present disclosure. In the example of FIG. 3A, the parser (205) identified six words in the corpus and has compiled the words into an ordered list referenced herein as a vocabulary (301). As shown in FIG. 3A, each document is converted to a vector by the vectorizer (206) to form vectorized documents (302). In the present example, the vectorizer (206) used was the inverse term-inverse document frequency (TF-IDF) vectorizer (206). The TF-IDF vectorizer (206) computes a value for each word, specified by a vocabulary (301), in a document to form a vectorized version of the document. The formula used with the TF-IDF vectorizer (206) to compute the value for each word in a document is $$\text{TF-IDF} = \text{TF}(\text{word}, \text{document}) * \text{IDF}(\text{word}, \text{document}), \quad (1)$$

where TF is the "term frequency", which is simply the number of times a word appears in a document, and IDF is the "inverse document frequency." In the example of FIG. 3A, the IDF is $$IDF = \log\left(\frac{m+1}{DF(\text{word})+1}\right) + 1, \quad (2)$$

where m is the number of labelled documents (109) in the corpus (204), and DF is the "document frequency" which is the number of the labelled documents (109) in which the identified word appeared at least once. In the example of FIG. 3A, the vectorized documents (302) correspond to the labelled documents (109) and vocabulary (301) shown with the value of m set to three. Additionally, each vectorized document in FIG. 3A has been normalized using an $L_2$ norm. However, one with ordinary skill in the art will recognize that other implementations of the TD-IDF vectorizer (206) are common in the literature, usually with alterations to EQ. 2. As such, it is emphasized that the implementation provided in FIG. 3A is given as an example and does not represent a limitation on the present disclosure. While not shown in FIG. 3A, the vectorized documents (302) may be further pre-processed. For example, considering the vectorized documents (302) as a matrix, where each row corresponds to a vector for a single document and each column represents a feature of the vectorization (e.g., each column may correspond to a word in the vocabulary (301)), the vectorized documents (302) may be normalized column-wise using any normalization technique (e.g. Manhattan norm, Euclidean norm) known in the art. Other pre-processing techniques may be applied to the vectorized documents (302).

Figure 3B:
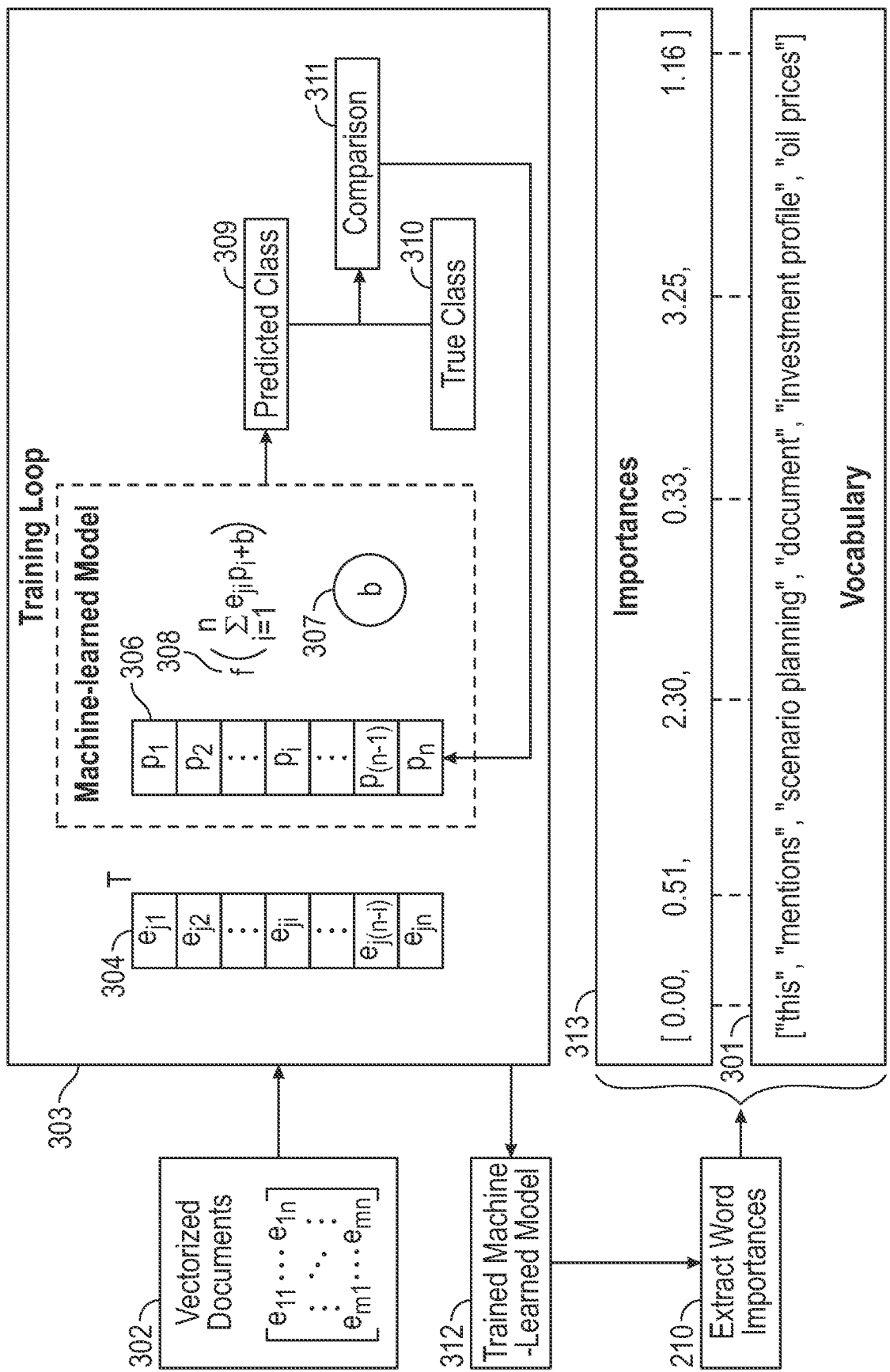
FIG. 3B depicts a system in accordance with one or more embodiments.

Turning to FIG. 3B, FIG. 3B provides greater detail surrounding training the machine-learned model (207). In FIG. 3B, vectorized documents (302) are represented as a matrix of size m×n, where m is the number of labelled documents (109) in the now-vectorized corpus (204) and n is the number of features in a vector representing a document. In the example of FIG. 3B, every element in the vectorized documents (302) is indexed by $e_{ji}$, where j is the document index and i is the feature index. Generally, a machine-learned model (305) may be considered a function which maps an input to an output. The exact mapping performed by a machine-learned model (305) is determined by a set of parameters. Note, that the parameters which determine the mapping of the machine-learned model (305) are not to be confused with hyperparameters which may govern or constrain the machine-learned model (305). Typically, a machine-learned model (305) is trained through a training loop (303). At each cycle of the training loop, the machine-learned model (305) receives a batch (304) of the vectorized documents (302). A batch (304) is simply a subset of the vectorized documents (302). The number of vectorized documents (302) in a batch (304) may be any number between 1 and m, or the total number of labelled documents (109) in the corpus (204). In some embodiments, only a portion of the vectorized documents (302) from the corpus (204) are made available for the training loop (303). The portion of vectorized documents (302) made available for training is referred to as the training set. The remaining vectorized documents (302) may be further partitioned into additional sets, such as a validation set and a test set. Generally, non-training sets may be used to configure the hyperparameters of a machine-learned model (305) and estimate the generalization error of the machine-learned model (305). In instances where the vectorized documents (302) are partitioned into various sets, the number of vectorized documents (302) in the training set may be denoted by $m_{training}$. In such cases, the number of vectorized documents (302) in a batch (304) may be any number between 1 and $m_{training}$. In the example of FIG. 3B, the batch (304) contains the vector for a single document, indexed by j. The batch (305) is processed, or mapped, by the machine-learned model (305) to form a prediction on the class (309) that should be assigned to the associated vectorized documents (302). Because the documents of the corpus (204) are labelled, the true class (310) is known. The predicted class (309) is compared to the true class (310) through a comparison (311). The comparison is usually a function which quantifies the difference between the true class (310) and the predicted class (309) for a batch (304). The results of the comparison (311) are used to inform a change to the parameters of the machine-learned model (305). Once the parameters of the machine-learned model (305) have been updated, a new cycle of the training loop (303) is initiated by providing another batch (304) to the machine-learned model (305). The training loop (303) is repeated until a stopping criterion is met. The stopping criterion is usually a fixed number of iterations (i.e. the number of completed cycles in the loop), or an indication that the accuracy of the machine-learned model (305), as determined through the comparison (311), is acceptable or has stalled.

To be more concrete, and in accordance with one or more embodiments, the machine-learned model (305) of FIG. 3B is further depicted as a logistic regression model. A logistic regression model may be thought of as being composed of three parts; namely, a parameter vector (306), a bias value (b) (307), and an activation function (308). The parameter vector (306), like the vector of a vectorized document (302), consists of n numeric elements depicted in FIG. 3B as $p_1$ to $p_n$. The bias value (b) (307) is a single numeric value. The activation function (308), in the most general case, may be any function which maps a numeric value to another numeric value. However, common activation functions for logistic regression include the sigmoid function, $$\sigma(x) = \frac{1}{1+e^{-x}},$$

and the hyperbolic tangent function, for classification problems with binary outcomes. Other adaptions to the logistic regression model, such as additional parameter vectors (306) and different choices in the activation function (308) can be applied such that the logistic regression model is readily amenable to multi-class classification. In some embodiments multiple binary class logistic regression models are trained to form a multi-class classifier. In the example of FIG. 3B, the input to the activation function of the logistic regression model is the addition of the bias value (b) (307) to the dot product of the vectorized documents (302), provided as inputs (e.g. through a batch (304) during the training loop (303)) and the parameter vector (303). The output of the activation function (308) is the returned value of the machine-learned model (305), which indicates the predicted class (309). The returned value is usually a probability that an associated vectorized document (302) belongs to a class. In most cases, the class with the highest probability is selected as the predicted class (309). A common comparison (311) function used while training a logistic regression model with a binary outcome is the "log loss" function, which is also commonly known as the "binary cross-entropy" function. For instances of multiple classes, as stated, multiple binary outcome logistic regression models may be trained together or the activation function (308) may be adapted to support multiple classes, such as the "softmax" activation function (308) used in coordination with a "cross-entropy" comparison (311) function. Continuing with the example of the logistic regression model, training the model consists of updating the parameter vector (306) and the bias value (307) based on the result of the comparison (311) function for each batch (304). One with ordinary skill in the art will recognize that there are many ways to update the machine-learned model (305) during the training loop (303). For example, while using a logistic regression model, the parameter vector (306) and bias value (307) are typically updated by stepping their respective values according to the gradient of the comparison (311) function, where the gradient is taken with respect to the parameter vector (306) and bias value (307) for every batch (304). As such, one with ordinary skill in the art will appreciate that the fact that not all comparison functions and update methods are enumerated herein does not impose a limitation on the present disclosure.

Keeping with FIG. 3B, once the machine-learned model (305) is trained, it may be referenced as the trained machine-learned model (312). Generally, machine-learned models (305), once trained, may be inspected to determine the "importance" of each feature with respect to the outcome of the model. Machine-learned models (305) such as decision trees, random forests, linear regression, and logistic regression may be readily inspected to determine feature importances. For example, the values of the parameter vector (306) in the logistic regression model, once trained, are indicative of the importance of each received feature. Other machine-learned models (305), for which feature importances are not readily available, may be made to return feature importances through techniques like Shapley Additive exPlanations (SHAP) analysis. In accordance with one or more embodiments, each feature is associated with a word. For example, each column in the vectorized documents (302) depicted in FIG. 3A is associated with a word in the vocabulary (301) also depicted in FIG. 3A. As such, in the context of the present invention, a feature importance may be considered a word importance. Returning to FIG. 3B, from the trained machine-learned model (312), the word importances (210) may be extracted. The extracted importances (313) are numerical values and, as stated, there is a word (e.g. from the vocabulary (301)) associated with each importance (313).

Figure 3C:
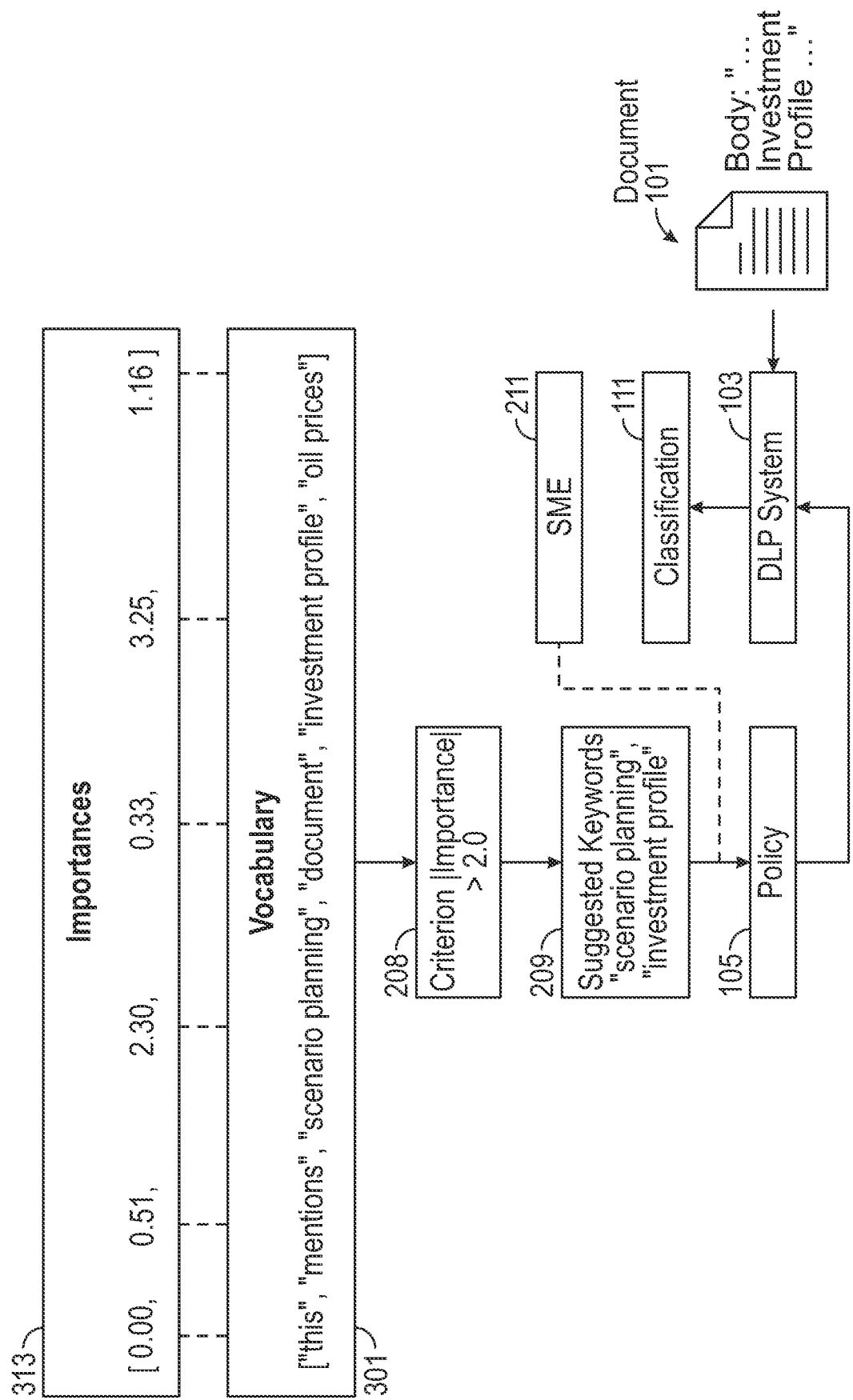
FIG. 3C depicts a system in accordance with one or more embodiments.

Turning to FIG. 3C, the word importances (313) are evaluated by a criterion. In the example of FIG. 3C, the criterion is a simple threshold where only the words with an absolute-valued importance (313) greater than 2.0 are promoted to suggested keywords (209). Other criterion or thresholds may be used as decided by a user. As seen in the example of FIG. 3C, the words "scenario planning" and "investment profile" meet the criterion (208) and are promoted as suggested keywords (209). As shown in FIG. 3C, and in accordance with one or more embodiments, all suggested keywords (209) are reviewed by a subject matter expert (SME) (211). The SME decides whether or not to use a suggested keyword (209) in the construction of the policy (105) for the DLP system (103).

Once configured by a policy (105), the DLP system (103) may process new documents (101). In the example of FIG. 3C, the new document (101) shown contains the word "investment profile" in the body of the document (101). In this case, the DLP system (103) processed said document (101) and assigned the document (101) the class of "confidential". In other words, the classification (111) of the document (101) was determined.

Figure 4:
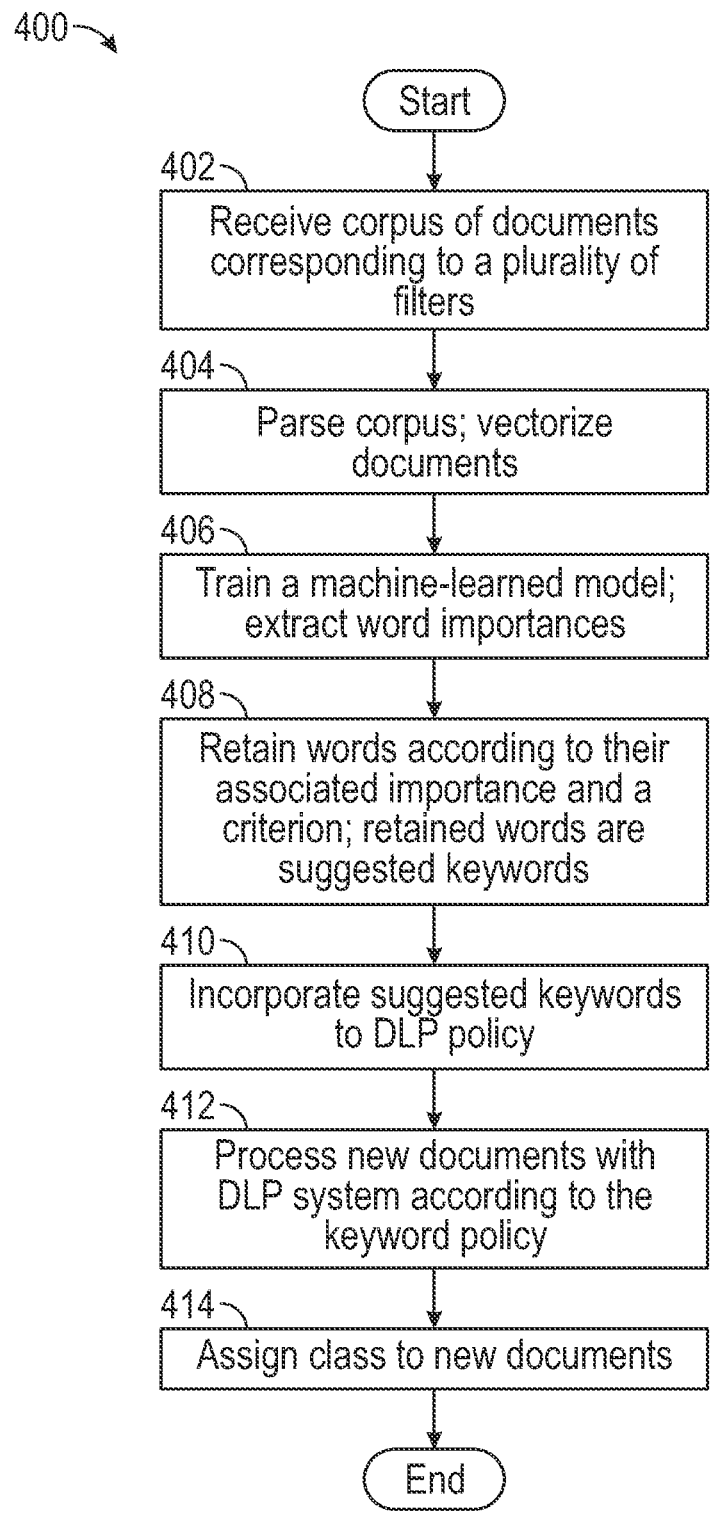
FIG. 4 depicts a flowchart in accordance with one or more embodiments.

The process of producing a policy (105) for a DLP system (103) using a machine-learned (207) model is summarized in the flowchart (400) of FIG. 4. As shown in Block 402, a corpus (204) of documents (101) is received from a repository (107). The corpus (204) is a subset of documents (101) from the repository (107) wherein the subset has been selected according to a query. The query is a plurality of filters. The plurality of filters may include an organization filter and a date range filter. For example, the query may indicate that only documents (101) from the human resources department of the enterprise, and only documents (101) within the date range of Mar. 1, 2020 to the present date are to be included in the corpus (204). The corpus (204) may be returned from the repository (107) according to the specified query using a data fetcher (203). In Block 404, the corpus (204) is parsed to identify and further filter out words from the corpus (204). Additionally, the corpus is vectorized such that each labelled document (109) within the corpus (204) is represented as a vector. As depicted in Block 406, the vectorized labelled documents (209) are used to train a machine-learned model (207). The trained machine-learned model (312) is inspected to determine an importance (313) for each parsed word in the corpus (204). In Block 408, words are retained if their importance (313) satisfies a criterion (208). An example criterion may be that the words are only retained if their associated importance (313) exceed a threshold value X. The retained words are considered suggested keywords (209) for a policy (105). As depicted in Block 410, the suggested keywords (209) are incorporated into the policy (105). The incorporation of the suggested keywords (209) into the policy (105) may be done automatically, or the suggested keywords (209) may be used to inform a subject matter expert (SME) (211) while constructing a policy (105). In Block 412, the policy (105), which is composed of at least some of the suggested keywords (209), is used to configure a DLP system (103). The DLP system (103), configured by the policy (105), is used to process new documents (101). The DLP system (103) assigns a class to each new document (101), as depicted in Block 414. As noted above, the class or classification assigned to a document or batch of documents may be sensitive, not sensitive, or any other classification that indicates the sensitivity of the content therein.

While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Embodiments of the present disclosure may provide at least one of the following advantages. As stated, while a DLP system (103) automates the process of identifying and classifying documents according to the sensitivity of their content, a DLP system (103) requires constant maintenance and tailoring to remain effective with ever-changing demands and definitions of data sensitivity. Embodiments herein may be used to generate up-to-date policies (105), or at least keywords (113), for a data leak prevention (DLP) system (103). The keywords (113) may be generated on-the-fly and tailored to the specific needs of an organization within an enterprise. The result is an effective DLP system (103) which accurately classifies documents and prevents unwanted data leakage. Because keywords (113) are identified by the trained machine-learned model (312), the time and effort required by a subject matter expert (SME) (211) to construct a policy (105) is significantly reduced. Further, the trained machine-learned model (312) may be used to output a classification (111) of new documents (101). The classification (111) determined by the trained machine-learned model (312) may be used to validate, or act as a secondary check on, the classification (111) result of the DLP system (103).

Figure 5:
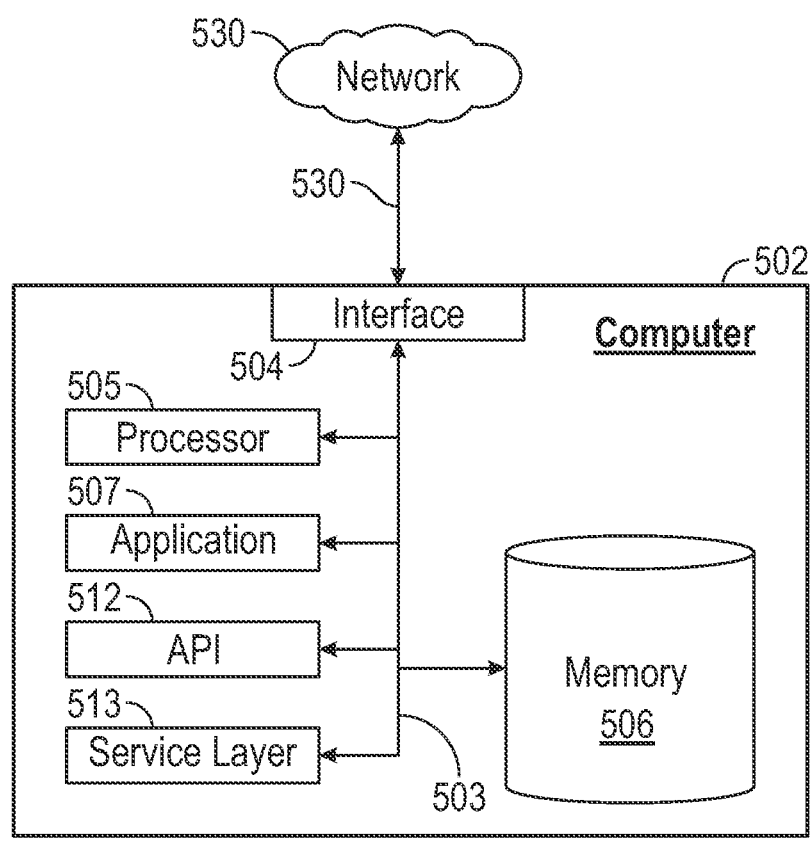
FIG. 5 depicts a system in accordance with one or more embodiments.

Embodiments of the present disclosure may be implemented on a computer system. FIG. 5 is a block diagram of a computer system (502) used to provide computational functionalities associated with described algorithms, methods, functions, processes, flows, and procedures as described in the instant disclosure, according to one or more embodiments. The illustrated computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or another suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504) includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). The memory may be a non-transitory computer readable medium. For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), wherein each computer (502) communicates over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
receiving, by a data leakage prevention (DLP) system comprising a computer processor, a machine learning (ML) system, a memory, and a data fetcher, a corpus of labelled documents using the data fetcher in the DLP system from a SQL-based repository and a plurality of filters comprising an organization filter,
wherein the corpus of labelled documents comprise at least one email, at least one spreadsheet, and at least one binary file,
wherein the data fetcher comprises an interface connected to the SQL-based repository that obtains the corpus of labelled documents based on one or more SQL commands comprising one or more queries based on the plurality of filters, and
wherein the ML system comprises a parser, a vectorizer, and a machine-learned model;
identifying, automatically by the DLP system, a plurality of parsed words in the corpus of labelled documents using the parser in the ML system;
vectorizing, by the DLP system, the corpus of labelled documents using the vectorizer in the ML system, comprising:
generating a matrix, wherein each of the rows of the matrix correspond to a labelled document and each of the columns of the matrix correspond to a parsed word from the plurality of parsed words,
determining, for each labelled document and using a Natural Language Processing (NLP) technique, a numerical value for each parsed word in the plurality of parsed words forming a vectorized document for that labelled document, and
populating the matrix with the with the numerical value of each parsed word in the plurality of parsed words for each labeled document;

training, by the ML system in the DLP system, the machine-learned model comprising:
predicting a document class for at least one vectorized document of the matrix,
comparing the predicted document class to a corresponding label of the at least one vectorized document, and
updating or determining one or more parameters of the machine-learned model based on the comparison,
wherein the trained machine-learned model accepts, as input, a vectorized document and outputs at least one predicted document class from a plurality of document classes comprising a sensitive document class and a non-sensitive document class;
extracting a plurality of word importances from the trained machine-learned model based on the one or more parameters, wherein the plurality of word importances comprises a word importance for each parsed word of the plurality of parsed words;
determining, automatically by the DLP system, a keyword-based policy based on the plurality of word importances and a portion of the plurality of parsed words that satisfy a criterion;
obtaining, by the DLP system, a new document; and
automatically classifying, by the DLP system, the new document as a sensitive document based on the keyword-based policy.

2. The method of claim 1, wherein the plurality of filters further comprises a date range filter.

3. The method of claim 1, further comprising evaluating the keyword-based policy by a subject matter expert, wherein the subject matter expert determines which parsed words are incorporated into the keyword-based policy of the data leakage prevention system.

4. The method of claim 1, further comprising pre-processing the vectorized documents before use with the machine-learned model.

5. The method of claim 1, further comprising:
selecting a machine-learned model type and an architecture; and
altering the machine-learned model type and/or architecture, or re-training the machine-learned model based, at least in part, on an evaluation of the keyword-based policy by a subject matter expert.

6. The method of claim 1, wherein the machine-learned model is a logistic regression model.

7. A non-transitory computer readable medium storing instructions executable by a computer processor, the instructions comprising functionality for:
receiving a corpus of labelled documents using a data fetcher from a SQL-based repository and a plurality of filters comprising an organization filter,
wherein the corpus of labelled documents comprise at least one email, at least one spreadsheet, and at least one binary file, and
wherein the data fetcher comprises an interface connected to the SQL-based repository that obtains the corpus of labelled documents based on one or more SQL commands comprising one or more queries based on the plurality of filters;
identifying, automatically, a plurality of parsed words in the corpus of labelled documents using a parser comprised by a machine learning (ML) system,
wherein the ML system further comprises a vectorizer, and a machine-learned model;
vectorizing the corpus of labelled documents using the vectorizer in the ML system, comprising:
generating a matrix, wherein each of the rows of the matrix correspond to a labelled document and each of the columns of the matrix correspond to a parsed word from the plurality of parsed words,
determining, for each labelled document and using a Natural Language Processing (NLP) technique, a numerical value for each parsed word in the plurality of parsed words forming a vectorized document for that labelled document, and
populating the matrix with the with the numerical value of each parsed word in the plurality of parsed words for each labeled document;
training, using the ML system, the machine-learned model, comprising:
predicting a document class for at least one vectorized document of the matrix,
comparing the predicted document class to a corresponding label of the at least one vectorized document, and
updating or determining one or more parameters of the machine-learned model based on the comparison,
wherein the trained machine-learned model accepts, as input, a vectorized document and outputs at least one predicted document class from a plurality of document classes comprising a sensitive document class and a non-sensitive document class;
extracting a plurality of word importances from the trained machine-learned model based on the one or more parameters wherein the plurality of word importances comprises a word importance for each parsed word of the plurality of parsed words;
determining, automatically, a keyword-based policy for a data leakage prevention (DLP) system based on the plurality of word importances and a portion of the plurality of parsed words that satisfy a criterion;
obtaining a new document; and
automatically, using the DLP system, classifying the new document as a sensitive document based on the keyword-based policy.

8. The non-transitory computer readable medium of claim 7, wherein the plurality of filters further comprises a date range filter.

9. The non-transitory computer readable medium of claim 7, wherein the keyword-based policy is evaluated by a subject matter expert, wherein the subject matter expert determines which parsed words are incorporated into the keyword-based policy of the data leakage prevention system.

10. The non-transitory computer readable medium of claim 7, the instructions further comprising functionality for:
pre-processing the vectorized documents before use with the machine-learned model.

11. The non-transitory computer readable medium of claim 7, the instructions further comprising functionality for:
selecting a machine-learned model type and an architecture; and
altering the machine-learned model type and/or architecture, or re-training the machine-learned model based, at least in part, on an evaluation of the keyword-based policy by a subject matter expert.

12. The non-transitory computer readable medium of claim 7, wherein the machine-learned model is a logistic regression model.

13. A data leak prevention (DLP) system, comprising:
a computer processor;

a memory;
a data fetcher comprising an interface connected to a SQL-based repository; and
a machine learning (ML) system comprising a parser, a vectorizer, and a machine-learned model,
wherein the DLP system is configured to:
  receive, using the data fetcher, a corpus of labelled documents comprising at least one email, at least one spreadsheet, and at least one binary file, wherein the data fetcher obtains the corpus from the SQL-based repository based on one or more SQL commands comprising one or more queries based on a plurality of filters;
  identify, automatically, a plurality of parsed words in the corpus of labelled documents using the parser in the ML system;
  vectorize the corpus of labelled documents using the vectorizer in the ML system, comprising:
    generating a matrix, wherein each of the rows of the matrix correspond to a labelled document and each of the columns of the matrix correspond to a parsed word from the plurality of parsed words,
    determining, for each labelled document and using a Natural Language Processing (NLP) technique, a numerical value for each parsed word in the plurality of parsed words forming a vectorized document for that labelled document, and
    populating the matrix with the with the numerical value of each parsed word in the plurality of parsed words for each labeled document;
  train, by the ML system, the machine-learned model, comprising:
    predicting a document class for at least one vectorized document of the matrix,
    comparing the predicted document class to a corresponding label of the at least one vectorized document, and
    updating or determining one or more parameters of the machine-learned model based on the comparison,
  wherein the trained machine-learned model accepts, as input, a vectorized document and outputs at least one predicted document class from a plurality of document classes comprising a sensitive document class and a non-sensitive document class;
  extract a plurality of word importances from the trained machine-learned model based on the one or more parameters, wherein the plurality of word importances comprises a word importance for each parsed word of the plurality of parsed words;
  determine, automatically, a keyword-based policy based on the plurality of word importances and a portion of the plurality of parsed words that satisfy a criterion;
  obtain a new document; and
  automatically classify the new document as a sensitive document based on the keyword-based policy.

14. The system of claim 13, wherein the plurality of filters further comprises a date range filter.

15. The system of claim 13, wherein the keyword-based policy is evaluated by a subject matter expert, wherein the subject matter expert determines which parsed words are incorporated into the keyword-based policy of the data leakage prevention system.

16. The system of claim 13, wherein the DLP system is further configured to:
  pre-process the vectorized documents before use with the machine-learned model.

17. The system of claim 13, wherein the DLP system is further configured to:
  select a machine-learned model type and an architecture; and
  alter the machine-learned model type and/or architecture, or re-train the machine-learned model based, at least in part, on an evaluation of the keyword-based policy by a subject matter expert.

* * * * *